United States Patent [19]

Steffan

[11] 4,083,278
[45] Apr. 11, 1978

[54] SHEAR SPRAY APPARATUS

[75] Inventor: Leonard D. Steffan, Perrysburg, Ohio

[73] Assignee: Owens-Illinois, Inc., Toledo, Ohio

[21] Appl. No.: 744,903

[22] Filed: Nov. 26, 1976

[51] Int. Cl.² .............................................. B26D 7/08
[52] U.S. Cl. ........................................ 83/169; 83/171
[58] Field of Search .................... 83/168, 169, 171, 13

[56] References Cited

U.S. PATENT DOCUMENTS 1,760,255  5/1930  Peiler ...................................... 83/171

Primary Examiner—Willie G. Abercrombie
Attorney, Agent, or Firm—D. T. Innis; Myron E. Click; David H. Wilson

[57] ABSTRACT

An apparatus is disclosed for cooling and lubricating shear blades for a glass feeder mechanism, with each blade having associated therewith a pair of spray heads in the form of blocks. These blocks are mounted above the blades with a generally vertical, fan-shaped, spray being issued from each spray head. The spray will consist of air and liquid, with the liquid being primarily water with a small amount of lubricant included therein. Each spray head is composed of a pair of blocks each having a passage, drilled therein, one communicating with air and the other with liquid, the blocks being separated by a pair of shims, with the shims having cut-out portions respectively to serve as exit openings for the combined air and liquid spray.

7 Claims, 6 Drawing Figures

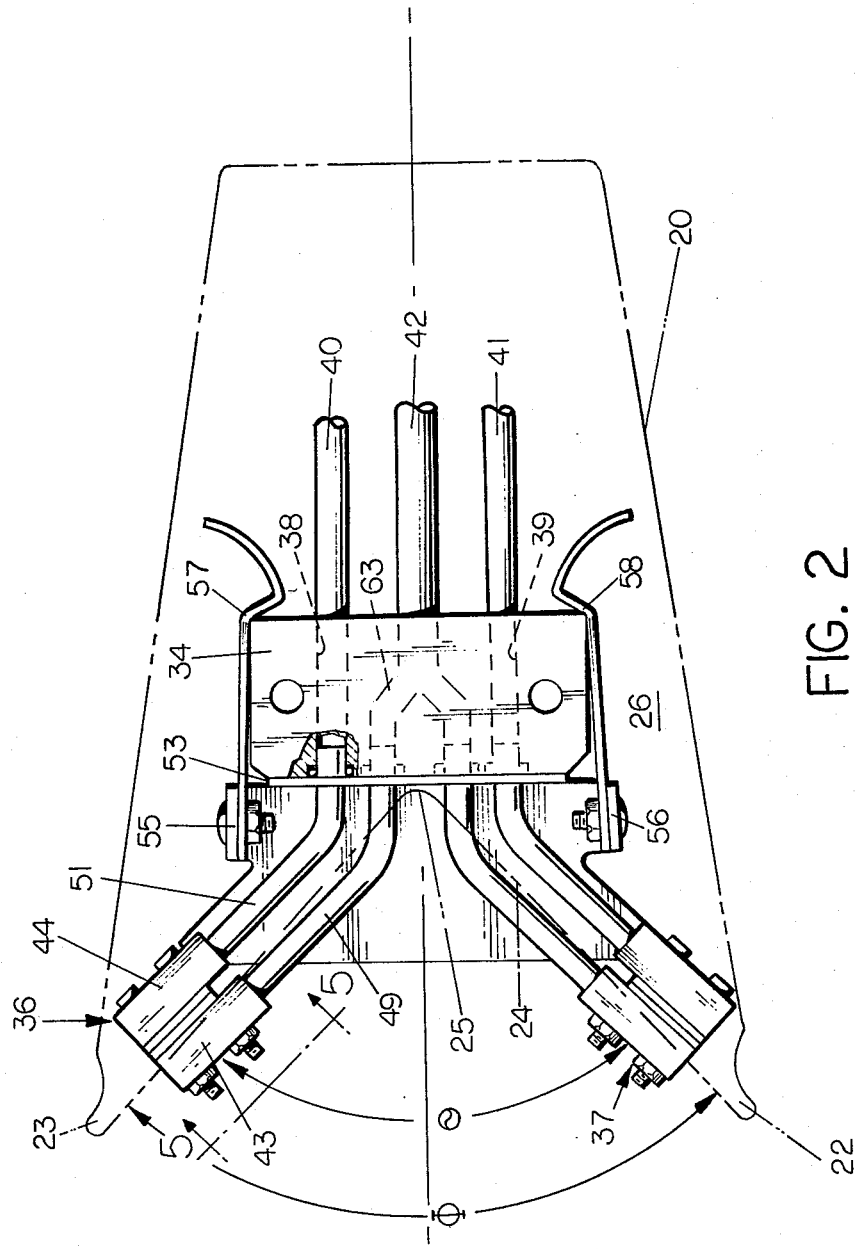

SHEAR SPRAY APPARATUS

BACKGROUND OF THE INVENTION

Devices for cooling and lubricating glass cutting blades by the discharge of a spray of a suitable liquid and air upon such blades when in open or non-cutting position are in wide-spread use. Furthermore, systems have been developed which are designed to be mounted to the shear mechanism and move with the shears or to move with the shears through less than the complete travel of the shears. These mechanisms have experienced serious maintenance problems in that they tend to be complex and, as would be expected, are subject to vibration during their reciprocation. It is difficult to keep proper alignment between the spray and the shears over an extended period of time. Those mechanisms which are positioned to spray only in the open or non-cutting position chiefly use water as the liquid component of the spray, primarily because it is generally available at relatively low cost. Water and air spray heads, however, have some shortcomings, among which may be mentioned the liquid lubricating qualities of water and its tendency to rust metallic parts to which it may be applied. Also to be considered is the presence in water of minerals or other foreign matter which tends to clog and obstruct passages and orifices of the sprayers.

It has been proposed in the past to provide mechanism for combining a substance having good lubricating, cleansing and rust-inhibiting properties with water and air to produce a relatively inexpensive spray for cooling and lubricating the glass cutting blades. One such mechanism is disclosed in U.S. Pat. No. 2,412,268 issued Dec. 10, 1946, wherein a mixture of air and water is directed in a generally fan-shaped configuration at right angles with respect to the longitudinal axis of the shear blades so as to cover two shear blades with the discharge from one spray head. A lubricant such as liquid detergent is mixed or injected cyclically into the water in response to each cutting cycle of the shear mechanism. This ability to inject a cleansing, lubricating and rust-inhibiting material into the stream of water is disclosed as being an improvement over the mode of operation of a shear spray mechanism of the type disclosed in U.S. Pat. No. 2,230,609 dated Feb. 4, 1941.

With the foregoing in view, it is an object of the present invention to provide a more stable mechanism for spraying shear blades in which closer control both as to the amount and application technique is accomplished in a shear spray process where the spray is continuously in operation.

SUMMARY OF THE INVENTION

Apparatus for cooling and lubricating shear blades of a glass feeder shearing mechanism wherein a generally fan-shaped spray of liquid and air is directed both downwardly and rearwardly toward the apex of the blade cutting edge to impinge on the blade in generally converging relationship whereby the impinged liquid moves toward the apex resulting in complete coverage of the glass contacting or shearing portion of the shear blade with a cooling and lubricating liquid.

BRIEF DESCRIPTION OF THE DRAWINGS

FIG. 2 is a plan view similar to FIG. 1 on an enlarged scale illustrating the position of the spray system of the invention relative to a shear blade;

DETAILED DESCRIPTION OF THE DRAWINGS

The apparatus of the invention, as the foregoing descripton would indicate, is directed to a mechanism for spraying the shear blades of the glass shearing mechanism. As previously indicated, it is important in the design of glass shearing systems that the blades be cooled during their normal operation and it is sometimes essential that they be lubricated along their cutting edges to avoid sticking of the blades one to the other. It should be understood that the blades are biased toward each other as they perform their shearing action by spring-tensioning means (not shown). The spring-tensioning is believed to be essential to the proper operation of the shear blades so as to cut the stream of glass cleanly and for the shear blades to not rub against each other with excessive friction. The shearing operation of nearly all glass shearing mechanisms is the result of energy stored in a main tension spring by the opening movement of the blades as the result of a rotating, motor driven, cam.

As can be seen when viewing the above-referred-to U.S. Pat. No. 2,412,268, typical shear mechanisms are moved apart by a mechanical connection and as they are moved apart, a spring is placed in tension in resistance to the movement of the blades to the open or spaced-apart position. Upon release of the force applied to open the blades, the blades quickly move into cutting position under the force of the energy stored in the spring. Therefore, it is desirable, and in many cases essential, that the shears interact in the same manner through an extended period of use without substantial maintenance.

Figure 1:
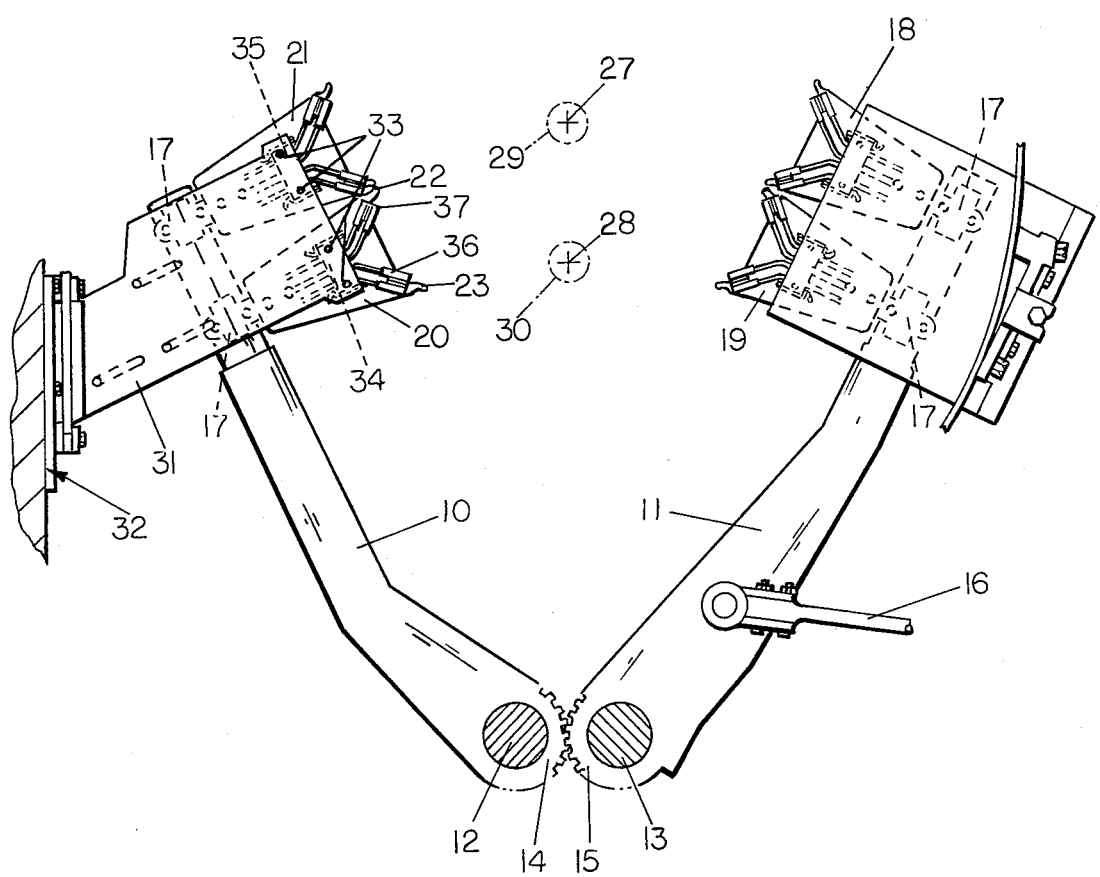
FIG. 1 is a plan view of the apparatus of the invention in its operative position.

With particular reference to FIG. 1, there is schematically shown a shear mechanism composed of a pair of arms 10 and 11. The arms 10 and 11 are provided with supporting shafts 12 and 13 about the axes of which the arms are movable. Both arms, as shown in FIG. 1, have spur gears 14 and 15 which are in mesh with each other so that movement of one arm will be reflected as equal and opposite movement of the other arm. An operating lever 16 connected to the arm 11 is longitudinally reciprocated to effect the opening of the shear blades, or the movement of the arms to the position shown in FIG. 1. Spring means (not shown) connected to the arm 10 will move the arms into closing relationship. Adjacent the ends of the arms 10 and 11 there are provided mounts 17 of generally conventional structure which serve to mount individual blades 18, 19, 20 and 21 to the arms 10 and 11. Netherlands Patent 7,201,535 dated Feb. 5, 1972, shows the mounting and general configuration of typical shear blades used in the sharing of glass into gobs. The patented shear blade has the added feature of a cooling pipe which the present invention does not employ.

Each blade has the general configuration, as best shown in FIGS. 2 an 3 by the dot-dash outline of the blade 20. The blade 20 has tips 22 and 23 at its forward end and the tips are connected together by a V-notch 24. The V-notch extends back to a point 25 and the blade is, in the instance of blade 20, beveled upwardly from adjacent the point 25 to an upper surface 26 to form a sharp cutting edge. From the point 25 to the tips 22 and 23 the blades also are beveled downwardly to a fairly sharp edge. It should be kept in mind that all of the blades have this same configuration; however, the blades 20 and 21 are the top blades while blades 18 and 19, the bottom blades, will be reversed 180° so as to engage along the bottom surface of the pair of blades 20 and 21 to effect the cutting of the charges of glass. As shown in FIG. 1, the blades will overlap and cut along the center line indicated by +'s 27 and 28. Dotted circles 29 and 30 represent the general size and position of the streams of glass that would be issuing from a forehearth and which the blades will be severing into discrete gobs or mold charges. Adjacent the retracted position of the blades 20 and 21 there is provided a mounting plate 31 which extends out from a stationary, vertical wall 32. The wall 32, in actual practice, may be the forehearth wall adjacent the feeder bowl in a glass melting and feeding installation. A glass feeder bowl is a generally hemispherical metal member lined with firebrick or other insulating ceramic capable of withstanding temperatures in the range of 2500° F.

The generally horizontal mounting plate 31, adjacent its outwardly extending end, has bolts 33 extending therethrough which in turn extend into openings formed in manifold blocks 34 and 35. The manifold blocks 34 and 35, as explained later in greater detail, serve as a mounting structure for shear spray heads 36 and 37. It should be understood that there are a pair of spray heads for each shear blade.

Figure 3:
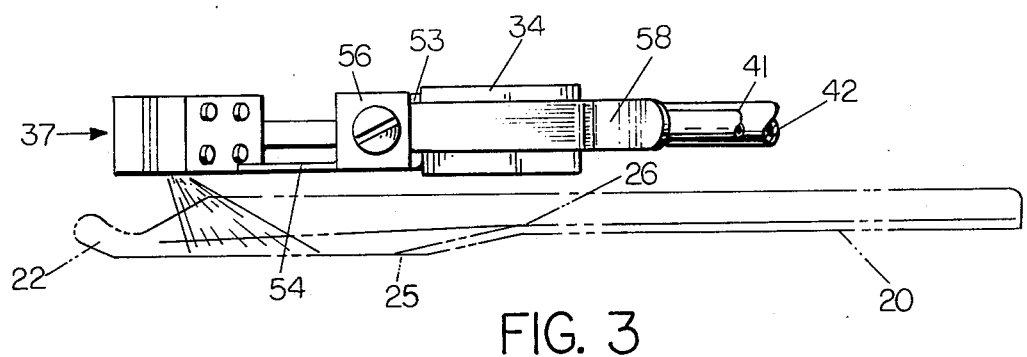
FIG. 3 is a side elevational view of the apparatus of FIG. 2.

Turning specifically to FIGS. 2 and 3, the manifold block 34 is shown as having two passages 38 and 39 extending therethrough. To the right of the block, as viewed in FIG. 2, tubes 40 and 41 are welded or brazed to the block 34 and are in communication with the passages 38 and 39 which extend through the block. Both tubes 40 and 41 are adapted to carry a water, lubricant mixture. It should be understood that the tube 40 will communicate with the spray head 36 while the tube 41 will communicate with the spray head 37. A center tube 42 of larger cross-section is brazed to the block 34, intermediate the tubes 40 and 41, and will communicate with a Y-shaped passage 63 in the block 34. The inlet passage splits into two exit passages on the opposite side of the block 34. This center tube 42 is connected to a source of air under pressure and will deliver air to both spray heads 36 and 37.

Figure 4:
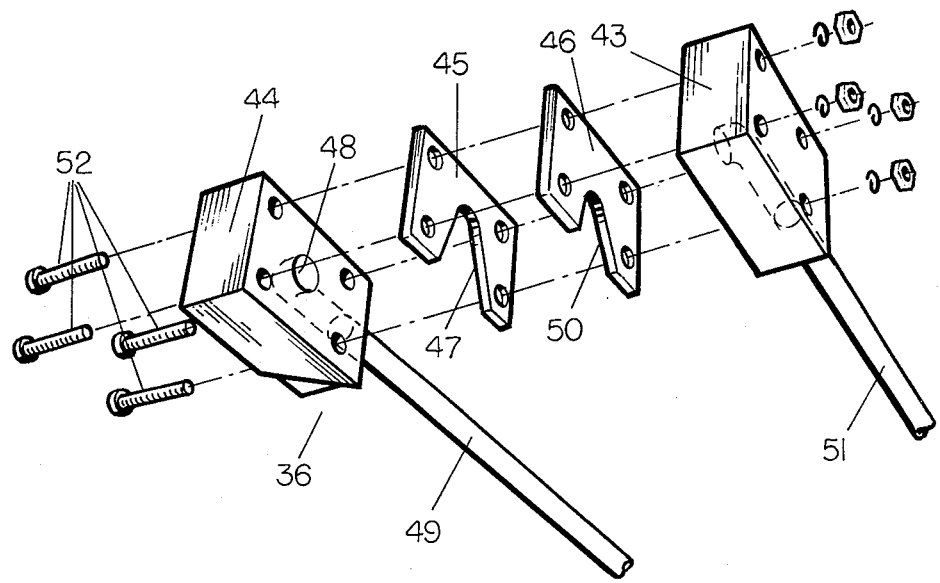
FIG. 4 is an exploded view on an enlarged scale of one of the spray heads.

As can best be seen when viewing FIGS. 2 and 4, one individual spray head is comprised of a pair of blocks 43 and 44. Between the blocks 43 and 44 are a pair of shims 45 and 46. Considering that the exploded view of FIG. 4 relates to the spray head designated 36 in FIG. 2, it should be understood that the spray head in FIG. 4 is being viewed from below in order to show the relationship of the passages in the blocks 43 and 44 and the specific configurations of the shims 45 and 46.

As can be seen in FIG. 4, shim 45 is provided with a slot 47 which extends from one edge thereof to a point at its apex where it will uncover the entire air hole or opening 43 in the block 44. In this manner air under pressure reaching the opening 48 by way of a tube 49, will enter the slot 47 and be expelled through the opening the slot forms with the edge of the shim 45. In a like manner, the shim 46 has a slot 50 whose apex communicates with a small segment or portion of a passage formed in the block 43 to which a tube 51 is connected. Tube 51 is connected to tube 40 so that water will enter the slot 50. It will be noted that the slot 47 is longer than the slot 50 so that the moving air picks up the water and forms a spray of water and oil which is fairly narrow in width but having a readwardly directed component when considering the mounting end of the blades as being to the rear.

As can be seen when viewing FIG. 4, the configuration of the slots 47 and 50 is such that when the two blocks 43 and 44 are assembled by bolts 52 with the shims interposed, a spray head is formed which will spray downwardly and impinge on the sharpened edges of the shear blades. The tube 51, as shown in FIG. 2, is fixed to and extends through a vertical plate 53.

In actual practice, the plate 53 is an angle plate which has a horizontol portion 54 and a pair of upstanding ears 55 and 56. Ears 55 and 56 are generally at right angles with respect to the plate 53 and serve as mounting members for spring clips 57 and 58. The manifold block 34, at the side thereof which faces the plate 53, is counterbored to provide seats for O-rings. The ends of the tubes 49 and 51 and the similar tubes which are connected to the head 37 will be provided, on the side of the plate 53 facing the block 34, with O-rings thereover. Assembling of the spray heads to the manifold block is by insertion of these tubes into the openings formed in the manifold block 34 with the spring clips 57 and 58 holding the assembld unit together. The spray head block 43 and the comparable block of the spray head 37 may be welded or brazed to the mounting plate 54 while the other blocks 44 are assembled to that block with the shims interposed. In this manner the spray heads may be disassembled for cleaning and maintenance. Other sims of any suitable configuration may be used in place of those shown in detail in FIG. 4 when it is desirable to effect a different spray pattern.

Figures 5, 6:
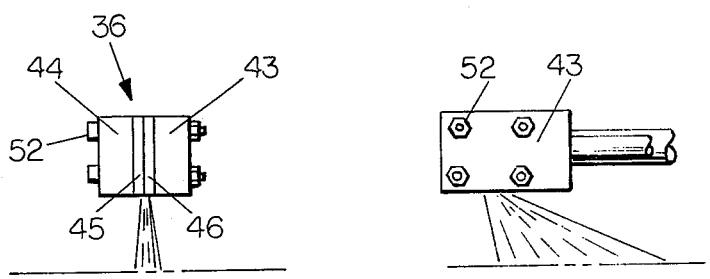
FIG. 5 is a schematic side view of one spray head taken at 5—5 of FIG. 2.
FIG. 6 is a schematic end view of the spray head of FIG. 5.

FIGS. 5 and 6 show the general shape and relationship of the spray to the shear blade as a result of the shim arrangement shown in FIG. 4.

The vertical plane of the shear spray, as illustrated in FIG. 6, will not be in the same plane as the edge of the blade being sprayed. As shown in FIG. 2, the included angle Φ between the edges of the blades are less than the included angle Θ between the planes of the shear spray heads 36 and 37.

I claim:

1. Apparatus for cooling and lubricating shear blades of a glass feeder shear mechanism in which the blades are reciprocated into and out of overlapping relationship to shear a stream of glass into mold charges and a stationary shear spray mechanism mounted above the blades, the improvement comprising:

a stationary manifold block individual to each shear blade;

means connected to said block for supplying air and liquid to said manifold;

a pair of spaced-apart spray heads;

means connecting the manifold to both spray heads to provide both air and liquid to each spray head;

said spray heads directing a fine spray of liquid and air against the top surface of the shear blade;

one spray head of each pair of spray heads being individual to one-half the shear blade and the other spray head being directed toward the other half of the shear blade;

the spray heads being positioned above the blades and to spray downwardly and rearwardly with regard to the shear blade when in its retracted position.

2. The apparatus of claim 1, further including means mounting said spray heads so as to direct a spray pattern at an angle with regard to the upper surface of each blade such that the liquid contacts the blades and moves along the surface of the cutting edges toward the blade mounting end thereof.

3. The apparatus of claim 2, wherein said spray heads provide vertical spray patterns of a generally fan shape.

4. The apparatus of claim 1, wherein each said spray had comprises two blocks each having a passage extending therein which opens out in a face thereof;

means mounting said blocks in predetermined, juxtaposed position, and wherein said means connecting the manifold to the spray head is connected to the opposite end of said passages whereby air is supplied to one block and liquid is supplied to the other block.

5. The aparatus of claim 4, wherein said blocks are separated by a pair of shims with the faces of the blocks having the openings, engaging the shims with said shims having spray directing cut-outs formed therein.

6. The apparatus of claim 5, wherein said cut-outs of the pair of shims are in alignment with each other, whereby air and liquid issue from the cut-out portions of the shims.

7. The apparatus of claim 5, wherein said shims have cut-outs of approximately 20° included angle, with the most vertical edges of both of the cut-outs forming a generally right angle with respect to the horizontal plane of the surface of the shear blade.

* * * * *